(12) United States Patent (10) Patent No.: US 6,607,606 B2
Bronson (45) Date of Patent: Aug. 19, 2003

(54) SELF-CLEANING LENS SHIELD

(75) Inventor: Barry Bronson, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 234 days.

(21) Appl. No.: 09/824,809

(22) Filed: Apr. 3, 2001

(65) Prior Publication Data

US 2002/0139394 A1 Oct. 3, 2002

(51) Int. Cl.⁷ .................................................. B08B 7/00
(52) U.S. Cl. ................................. 134/6; 134/2; 134/15; 134/44; 134/57 R; 134/104.1; 134/149; 315/82
(58) Field of Search .............................. 134/44, 52, 53, 134/54, 56 R, 57 R, 104.1, 2, 6, 15, 149; 315/82

(56) References Cited

U.S. PATENT DOCUMENTS 3,609,450 A * 9/1971 Hart ............................. 315/82
5,068,770 A * 11/1991 Baziuk ....................... 362/509
5,988,191 A * 11/1999 Duncan ....................... 134/149

* cited by examiner

Primary Examiner—Randy Gulakowski
Assistant Examiner—Gentle E Winter

(57) ABSTRACT

The present invention is a method and apparatus for shielding the lens and the field of view of an optical device, such as a camera or an image projector, from obstruction by unwanted contaminants such as dust, dirt, rain, and the like. The invention employs a transparent shield positioned to protect the lens from such contaminants. A wiper is positioned to be in contact with the shield but the wiper is also positioned to not obstruct the field of view. A rotation mechanism is used to cause rotation of the shield. Contaminants that may be deposited upon the shield may be wiped from the shield by the wiper yet the wiper does not obstruct the field of view. Rotation of the shield allows a portion of the shield that is obstructed by a contaminant to be rotated away from the field of view. Rotation of the shield allows a portion of the shield that has been wiped to be rotated into the field of view.

14 Claims, 11 Drawing Sheets

SELF-CLEANING LENS SHIELD

FIELD OF THE INVENTION

The present invention relates to a method and apparatus for shielding the lens of an optical device, such as a camera or an image projector, from contaminant particles such as rain, dust, and dirt.

BACKGROUND ART

There are a variety of optical devices that use lenses. Such devices include devices that receive images, such as video cameras and video monitors, and also include devices that project images, such as video projectors. Some optical devices are used by placing them in remote locations for use without a person attending the optical device, such as a video camera positioned at a strategic vehicle traffic intersection or such as a video projector positioned at the ceiling of a conference room or such as a motion picture projector positioned at a projection room of a movie theater. Other examples of cameras that are located remotely are the so-called "web cameras" or "webcams" which are accessible through the internet and which permit viewers to visit live scenes at innumerable locations throughout the world.

Contaminant particles such as rain, dust, dirt, insects and insect excreta, etc., may become deposited on the lens of an optical device, and such deposit may occur, for example, by the action of gravity or by air currents such as wind. Such contaminants are undesired since they impair the optical path of the optical device, in other words, the contaminants cause the received or projected image to lose its optical fidelity, and the contaminants may become visible on the image. Accordingly, it is desired that the cleanliness of lenses of optical devices be maintained, that is, it is desired that lenses be kept free contaminants.

In the prior art, optical devices are often placed in and protected by housings such as that illustrated by FIG. 1. FIG. 1 illustrates housing 10 for a traffic camera, or security camera, housed within housing 10 for protection of the camera from the elements of nature such as rain, dust, wind, birds, insects and so forth. Housing 10 is an enclosure which has sides 12 which provide structural support as well as protection and which may be constructed of materials such as metal, plastic, and so forth. Housing has shield 14 which is constructed of transparent glass or plastic and thus is optically transparent. Housing 10 has a mounting bracket 15 which is used to attach housing 10 to a support structure such as to the top of a pole or to eaves under a roof overhang. Data wire 16 provides a communication path for optical data to be transmitted between housing 10 and a remote location. Power line 18 provides an electric power transmission path to housing 10 to provide electric power that is necessary to operate the optical device.

The camera that is housed within housing 10 has lens 20 which is indicated by hidden lines since lens 20 is behind shield 14 and thus lens 20 is protected from the elements and from contaminants by shield 14. Accordingly, housing 10 protects the camera and its lens from contaminants such as dust, dirt, and rain.

In FIG. 1, contaminants 22 are illustrated in a position shield 14 that would impair the field of view of lens 20. In other words, the field of view of the lens becomes obstructed and the image that is either being received or projected loses its optical fidelity. Contaminants 22 are illustrated as adhering to shield 14 and happen to be positioned in front of lens 20. Contaminants 22 may be undesired water droplets, dirt particles, dust, pollutants, insects, insect excreta, or other contaminants. As used herein, "field of view" refers to the field of view of lens 20.

Examples of impaired field of views can be observed when one looks at an image of a remotely mounted traffic camera, or a security camera on a windy and rainy day. While a housing 10 with a shield 14 protects the optical device from contaminants 22, the problem then becomes one of maintaining the cleanliness of the shield 14 rather than maintaining the cleanliness of the lens 20. The contaminants 22 will collect on the shield 14 but are nonetheless visible in the field of view since the quality of the image depends upon the cleanliness of shield 14.

Another example of the undesired effect can be observed when contaminants 22 finds their way onto the camera lense in a movie theater. The image of contaminant 22, such as the image of a piece of dust or hair, is projected onto the movie screen to the annoyance of the audience.

The simple solution of the prior art would be to manually clean contaminants 22 from lenses 20 or shields 14 when the deposits become noticeable or to clean the lenses 20 or shields 14 on a scheduled basis.

In the prior art, a solution to this problem is for a maintenance worker to gain access to the protective housing 10 and manually remove the contaminants 22. In other words, the maintenance worker uses a clean tissue or cloth held in the worker's hand, and perhaps an appropriate cleaning fluid on the tissue or cloth, to wipe the undesired contaminant off shield 14.

There are instances when the protective housing 10 and camera are mounted in a location that is remote, either by being distant and inconvenient to access, or by being relatively inaccessible such as being located at the top of a long pole or otherwise out of convenient reach. Similarly, projectors are often located in relatively inaccessible locations, for example, near the ceiling of a conference room or of a movie theater. In all of these instances, it is inconvenient to manually wipe contaminants 22 from shield 14 due to the relative inaccessibility of the shield 14 to the reach of a workers hand held tissue or cloth. In such instances, it becomes inconvenient and economically costly to maintain the cleanliness of lens shields, such as that illustrated by shield 14.

A prior art is protective housings 10 which have wipers 23 that provide reciprocating motion across shield 14 which is kept stationary with respect to lense 20. However, this prior art has a limitation in that the wiper 23 crosses the field of view of lens 20 which causes loss of optical fidelity, distraction of viewers, and annoyance of viewers, depending upon the viewing or projecting circumstances. This reciprocating motion may be characterized as an obstruction of the field of view of lens 20.

Another prior art is found in the automobile racing field and features shields which are provided with lateral reciprocating motion to cause wiping by wipers that are located outside of the field of view of lens 20. The shields of this prior art are moved back and forth and are moved sufficiently far as to cause contaminants 22 to be wiped by wipers that may be stationary but which are located out of the field of view of lens 20. This prior art may have a limitation in that contaminants 22 may not be completely removed by the wipers and the contaminants may travel back and forth across the field of view. Moreover, the reciprocating motion of the shield of this prior art may cause annoyance to the viewer.

From the limitations in the prior art that are described above, it can be seen that it is desirable to improve the ways for maintaining the cleanliness of the lens shield of optical devices that are protected by a housing.

SUMMARY OF THE INVENTION

The present invention is a method and apparatus for shielding the lens and the field of view of an optical device, such as a camera or an image projector, from obstruction by unwanted contaminants such as dust, dirt, rain, and the like. The invention employs a transparent shield positioned to protect the lens from such contaminants. A wiper is positioned to be in contact with the shield but the wiper is also positioned to not obstruct the field of view. A rotation mechanism is used to cause rotation of the shield. Contaminants that may be deposited upon the shield may be wiped from the shield by the wiper yet the wiper does not obstruct the field of view. Rotation of the shield allows a portion of the shield that is obstructed by a contaminant to be rotated away from the field of view. Rotation of the shield allows a portion of the shield that has been wiped to be rotated into the field of view.

DETAILED DESCRIPTION

Figure 1:
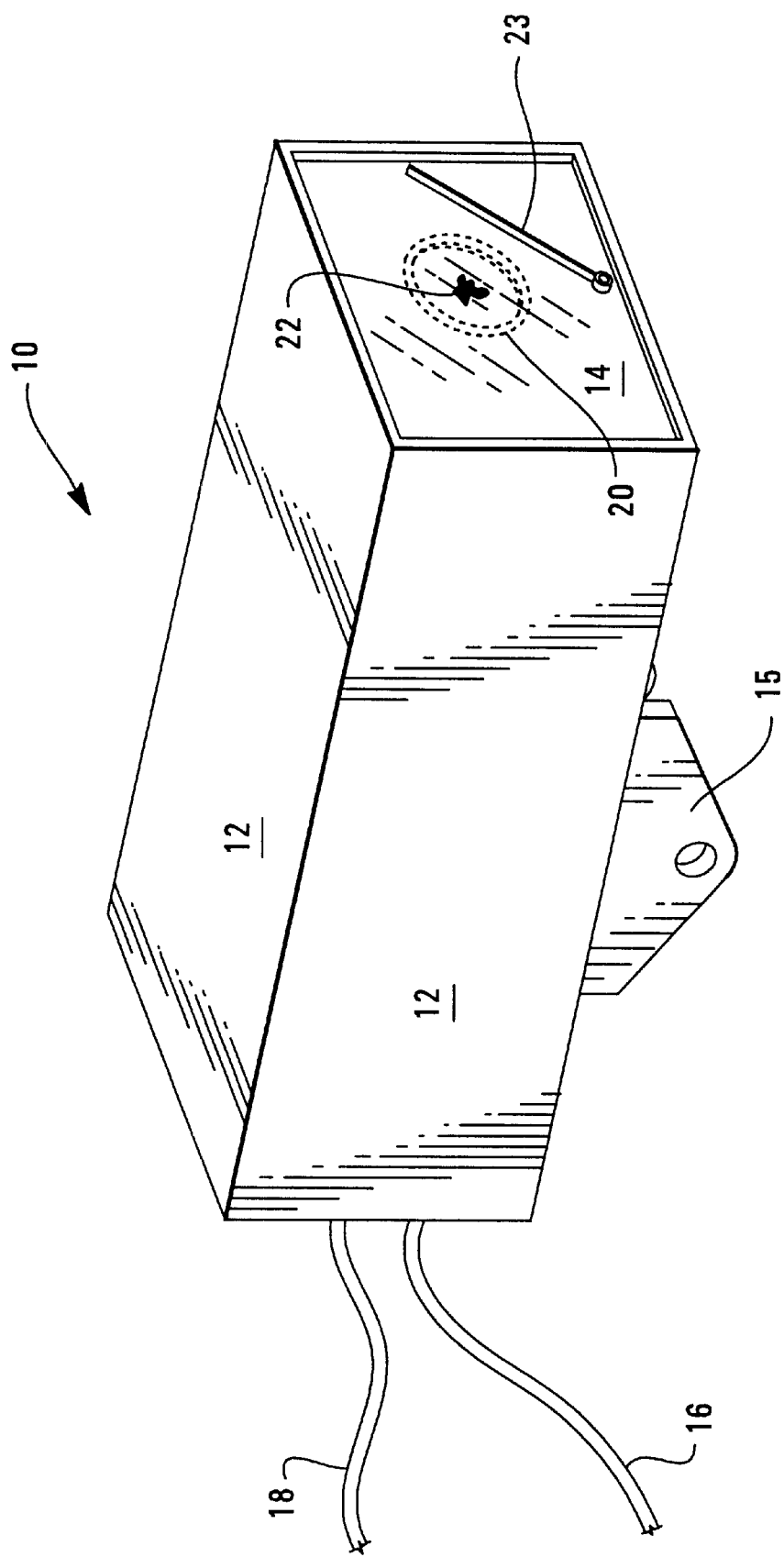
FIG. 1 is a perspective view which shows a prior art housing for protecting a camera from contamination by dirt, rain or pollution.

In the following detailed description and in the several figures of the drawings, like elements are identified with like reference numerals.

The present invention provides a self cleaning lens shield that is useful for use with cameras, image projectors such as video projectors, or other optical devices. The present invention, when referring to "optical devices" is not intended to be limited to light in the visible spectrum. This self cleaning lens shield overcomes the limitations of the prior art since when using the present invention it becomes not necessary for a person to manually clean lens shields. Moreover, if the optical device is remotely mounted, inaccessible due to height, distance, or other conditions, present inventions saves the inconvenience or possible danger of climbing ladders or using other means of inconvenient access.

Figure 2:
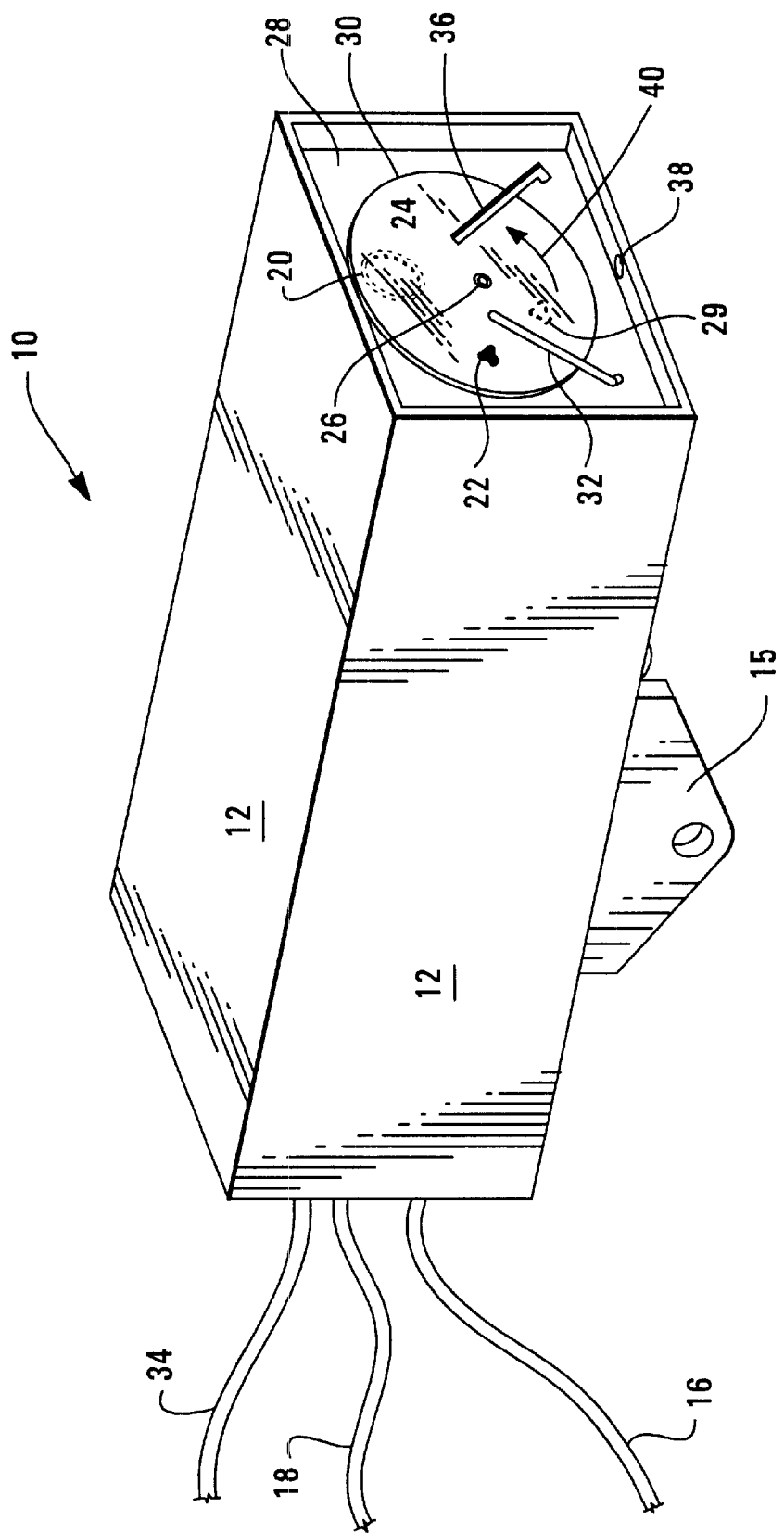
FIG. 2 is a perspective view of an optical device housing of the present invention.

In FIG. 2, the present invention is generally illustrated in a perspective view. The present invention may be employed with a housing similar to that of the prior art, in which case housing 10, sides 12, bracket 15, data wire 16, power line 18, and lens 20 are of similar construction, function, and inter-relationship as their like elements in the prior art. In the invention, housing 10 may be an enclosure specifically fabricated in order to house components such a those components that will be described in further detail herein. Conversely, housing 10 may be a pre-existing vacant space in a structure, or may be a vacant space in a structure where the vacant space is designed to accommodate equipment such as described in further detail herein.

The term "lens 20" as used herein is illustrative and should be taken to mean any device that is capable of receiving or emitting optical (visible and invisible) light.

The present invention has shield 24 which serves the same general function as that of shield 14 of the prior art except that shield 24 is different in important respects as will be discussed in further detail below. Shield 24 is attached to an axle (illustrated in a subsequent drawing) by axle fastener 26. Shield 24 is illustrated as a circular, planar surface, although non-planar, such as convex and concave embodiments, would be feasible. Additionally, shield 24 need not be circular in shape but the inventor believes that a generally circular shape features ease of manufacture, construction and use of the present invention. The axle referred to above is within housing 10 and is perpendicular to shield 24. A motor within housing 10 is mechanically coupled to the axle so as to permit the motor to rotate the axle which in turn causes shield 24 to rotate in its plane, such rotation being about an axis defined by the axle.

In the present invention, housing 10 has apron 28 which is at the lens end of housing 10. Apron 28 may be similar in material and construction to sides 12 of housing 10 in that apron 28 functions similar to sides 12 to protect lens 20 from contaminants. Apron 28 has an aperture 30 and aperture 30 is illustrated as a circular opening although other shapes could be used. Shield 24 is positioned in front of aperture 30, behind aperture 30, or within aperture 30 such that the combination of shield 24 and aperture 30 provide protection of the optical device from the elements. Shield 24 may be larger than aperture 30 and thus positioned either in front of aperture 30 or behind aperture 30. Shield 24 may be smaller than aperture 30 and thus may be placed within aperture 30. In one embodiment of the invention, a sealing material, such as soft rubber or neoprene, is used to seal any gaps between shield 24 and aperture 30. Such a seal would permit rotational movement of shield 24. The "behind" side of aperture 30 is the side of apron 28 which is close to lens 20 and thus the "behind" side of aperture 30 is within the enclosure provided by housing 10. The "front" side of aperture 30 is the side of apron 28 which is away from lens 20 and thus the "front" side of aperture 30 is outside the enclosure provided by housing 10.

Fluid applicator 32 is illustrated as fastened to apron 28 but may be similarly attached elsewhere such as attached to a side 12. Fluid applicator 32 provides a means for applying cleaning fluid 29, which may be water or a cleaning solution, onto shield 24. Cleaning fluid 29 may be delivered to housing 10 and fluid applicator 32 by way of cleaning fluid supply line 34.

Wiper arm 36 is illustrated as fastened to apron 28 but may be similarly attached to a bottom side 12. Drain hole 38 is illustrated as an aperture through side 12 and drain hole 38 is located below shield 24. Drain hole 38 is optional and a disadvantage of using drain hole 38 is that it may become clogged with removed contaminants 22. Directional arrow 40 illustrates for one embodiment of the invention the direction of rotation of shield 24. In the embodiment that is illustrated, the direction of rotation is counter-clockwise. By exchanging the positions of fluid applicator 32 and wiper arm 36, the invention could be made to function by rotating shield 24 clockwise.

The invention functions as follows: Contaminant 22 is deposited by the elements onto shield 24. Shield 24 rotates and fluid applicator 32 applies cleaning fluid 29 onto shield 24 and onto contaminant 22 as contaminant 22 passes under fluid applicator 32. Contaminant 22 with cleaning fluid 29 rotates towards and into wiper arm 36 which features a wiper blade to dislodge contaminant 22 from shield 24 and to squeegee, that is, to wipe and remove contaminant 22 and cleaning fluid 29 from shield 24. Gravitational force may be employed to permit dislodged contaminant 22 and cleaning fluid to flow downward into and through drain hole 38.

While wiper arm 36 may be fixed in position with all of the relative motion between shield 24 and wiper arm 36 caused by rotation of shield 36, the present invention may employ an alternative apparatus and method. In the alternative apparatus and method, wiper arm 36 is provided with a reciprocating mechanism which causes wiper arm 36 to move, for example sweeping an arc across shield 24. In this embodiment, wiper arm 36 is a reciprocating wiper arm and it may move in reciprocating motion across stationary or rotating shield 24 to wipe contaminants 22 free from shield 24 and thereby provide a cleaned portion of shield 24. Shield 24 is rotated such that the cleaned portion is moved into the field of view of lens 20. In this embodiment, the wiper arm 36 is located such that all sweeping motion of wiper arm 36 occurs outside of the field of view of lens 20. This embodiment having a reciprocating wiper arm 36 could also feature an additional wiper arm positioned to act as a squeegee while employing the rotation motion of shield 24 to rotate shield 24 past the squeegee.

In the embodiment illustrated by FIG. 2, the cleaning function occurs in the lower half of the shield 24 while the lens 20 is located behind the upper half of the shield. This way, contaminants 22 and cleaning fluid 29 flow downward by gravity and away from the field of view of lens 20. By the time that a portion of shield 24 rotates to the front of shield 24, that portion of shield 24 will have been cleaned by the present invention.

Figure 3:
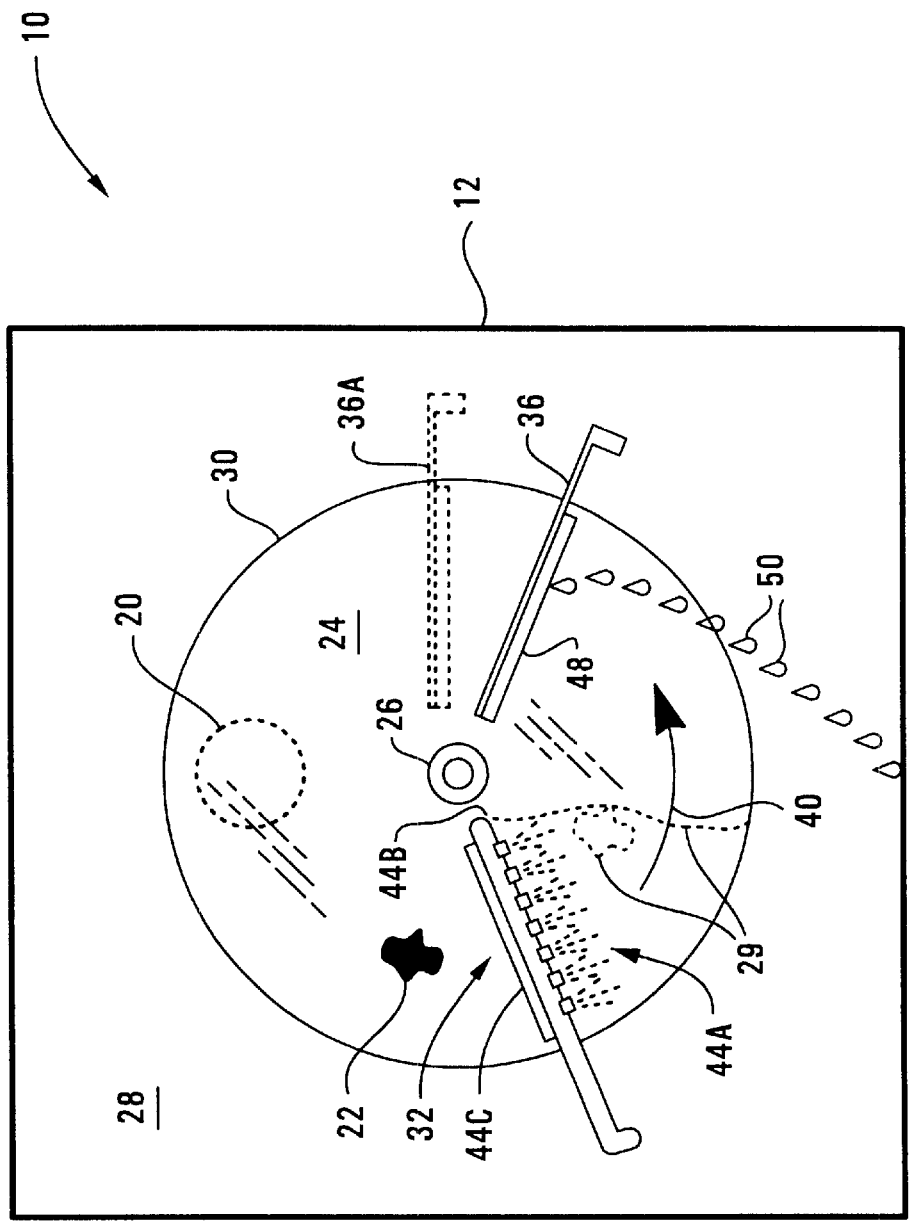
FIG. 3 is an elevation view of a lens shield and contaminant cleaning system of the present invention.

Wiper arm 36 and its associated wiper blade may be collectively referred to as a "wiper." The invention in its various embodiments both already described and subsequently described is capable of operating such that the wiper does not obstruct the field of view of the optical device. By use of the term "does not obstruct the field of view" the inventor means that the invention is capable of performing the cleaning function of the invention such that the wiper does not pass across the field of view. I FIG. 3 is an elevation view of the shield area of the present invention. Fluid applicator 32 is illustrated in more detail, this view revealing a number of spray nozzles 44A which are attached to or are integrated into fluid applicator 32 along the length of fluid applicator 32. In this embodiment a spray nozzle 44 is considered to be a "nozzle" in that it has a constricted opening (compared to the diameter of cleaning fluid supply line 34 to cause increased fluid pressure at the nozzle. The number of spray nozzles 44A is a design choice as is the selected distance between the fluid applicator 32 and shield 24. The number of spray nozzles 44A could be as few as zero. In the case that there is no cleaning fluid outlet 44 provided the invention would operate without cleaning fluid. In fact, fluid applicator 32 may be omitted from certain embodiments of the invention such as wet weather applications including marine craft, cars that race in wet weather, and so forth. However, the inventor believes that use of cleaning fluid may be preferable to provide improved cleaning action than dry action.

In this embodiment a spray nozzle 44 is considered to be a "nozzle" in that it has a constricted opening (compared to the diameter of cleaning fluid supply line 34 to cause increased fluid pressure at the nozzle.

Instead of a fluid applicator 32 with one or more spray nozzles 44A, the present invention could use a cleaning fluid applicator 32 having a cleaning fluid outlet 44B that applies drops of cleaning fluid or that applies streams of cleaning fluid at a well chosen location on shield 24. In contrast to a nozzle, the cleaning fluid outlet 44B would have an unconstricted opening such that fluid pressure at the opening would be similar to pressure within the cleaning fluid supply line 34. The inventor believes that such a well chosen location would be near the center of shield 24, that is, near axle fastener 26 as is illustrated. Such a system could employ an arm such as fluid applicator 32 as illustrated but instead of spray nozzles 44A would typically employ a cleaning fluid outlet 44 for flow of cleaning fluid onto shield 24.

The apparatus and method employing cleaning fluid outlet 44B would position cleaning fluid outlet 44B such that drops of cleaning fluid or streams of cleaning fluid are deposited onto shield 24. Such a system could be passive in part in that cleaning fluid could be permitted to flow by gravity onto shield 24. Such a system would result in a stream of cleaning fluid flowing by gravity in a downward direction.

Another approach would be instead of using spray nozzles 44A or cleaning fluid outlet 44B to fasten some a wick material 44C to fluid applicator 32 with the wick material 44C being in contact with shield 24 and to have wick material 44C use capillary action to deposit cleaning fluid onto shield 24. With this wick-type system, cleaning fluid would be deposited onto the wick material 44C and capillary action would distribute the cleaning fluid throughout the wick material 44C and thence onto shield 24.

It can be seen that use of any of the spray nozzles 44A, cleaning fluid outlet 44B, and wick material 44C provides a system for depositing cleaning fluid onto shield 24. If spray nozzles 44A are used, then spray particles are sprayed onto shield. If cleaning fluid outlet 44B is used, then a stream of cleaning fluid particles is deposited near axle fastener 26 and descends, by action of gravity, downward along shield 24. If wick material 44C is used, then spray particles are rubbed or deposited by capillary action onto shield 24 by the wick material 44C Wiper arm 36 is illustrated with wiper blade 48. Wiper blade 48 extends along the length of wiper arm 36 and wiper blade 48 is in wiping contact with shield 24. Wiper arm 36 may be fixed in position with relative movement of shield 24 and wiper blade 48 caused by rotational movement of shield 24. One orientation of wiper blade 48 is from the periphery of shield 24, that is from near aperture 30, towards axle fastener 26.

The wiper blade 48 may be a conventional soft plastic, such as used for windshield wipers of automobiles. Alternatively, wiper blade 48 could be provided as a brush.

A single wiper arm 36 may be provided. Alternatively, More than one wiper arm 36 may be provided, with a first wiper arm 36 being used for dislodging heavier debris and with an additional one or more wiper arm 36 being used for dry wipe, that is, for a second wipe such that by the time shield 24 is rotated to the field of view of lens 20 shield 24 has been well cleaned. In an embodiment in which more than one wiper arm 36 is used, it would be advantage to place the additional wiper arm similarly as the first wiper arm but with the additional wiper arm placed after the first wiper arm 36 but before the field of view of lens 20 with the "after" and "before" being with respect to the rotation shield 24. In other words, the second wiper arm 36 wipes a portion of shield 24 after shield 24 has been wiped by the first wiper arm 36 but before that portion of shield 24 is rotated into the field of view of lens 20. The dashed line indicated by reference numeral 36A indicates a location for an additional wiper arm 36. With two or more wiper arms 36, combinations may be made of brushes as wiper blades 48 on one wiper arm 36 with soft rubber wiper blades 48 on another wiper arm 36.

If one considers shield 24 of FIG. 3 to have locations that could be described as locations on a clock face, it can be observed that fluid applicator 32 is located at approximately the eight o'clock position while wiper arm 36 is located at approximately the four o'clock position, and lens 20 located at approximately the twelve o'clock position. In this embodiment, the direction of rotation of shield 24 is counterclockwise. It should be understood that these positions are merely illustrative. The locations are preferably selected however, by the fluid applicator 32 and wiper arm 36 positioned so as to not obstruct the field of view of lens 20. With respect to the direction of rotation of shield 24, cleaning fluid 29 should be deposited such that rotation of shield 24 moves cleaning fluid 29 towards the direction of wiper arm 36 and away from the direction of lens 20. This preference in rotation of shield 24 to carry cleaning fluid towards wiper arm 36 and away from lens 20 is motivated by a desire that wiper blade 48 remove cleaning fluid 29 from shield 24 to prevent cleaning fluid 29 from obstructing the field of view of lens 20.

To describe the operation of the system in a concise manner, fluid applicator 32 applies cleaning fluid 29 onto shield 22, such application being accomplished through spray nozzles 44A, cleaning fluid outlet 44, or wick material 44B. Cleaning fluid 29 interacts with and loosens contaminants 22 that may have been deposited onto shield 24. The rotational motion of shield 22 moves that contaminants 22 and cleaning fluid 29 into wiper blade 48 and wiper blade 38 dislodges contaminants 22 and wipes cleaning fluid 29 causing contaminants 22 and cleaning fluid 29 to drain away and off of shield 24. In draining away from shield 24, the runoff 50 may simply drip away, may drip into a drain hole, such as drain hole 38 illustrated in FIG. 2 or may drip away to a drainage tube, and so forth.

The invention may cause shield 24 to be rotated to complete full rotations as part of a cleaning process or the invention or may instead utilize less than complete rotations, such as rotating shield 24 with sufficient angular displacement such that a contaminant 22 is moved out of the field of view of lens 20. For example, shield 24 could be rotated one-fourth of a rotation, or some other fraction of a complete rotation to move a contaminant 22 out of the field of view. Of course, a complete rotation would be a three-hundred sixty degree rotation.

The present invention can provide its cleaning function by rotating shield 24 in a substantially unidirectional rotational movement of shield 24. In other words, the wiping and cleaning function is provided by rotating shield 24 about an axis in a substantially counter clockwise rotation (or in a different embodiment in a substantially clockwise rotation) with the wiping and cleaning action being provided as a result of the unidirectional rotation. Substantially unidirectional rotational movement means that the present invention is capable of providing its wiping and cleaning function in the absence of substantial reciprocating motion of either the shield 24 or a wiper arm 36. It should be understood that while the present invention could employ reciprocating movement, for example, shield 24 could be rotated in a reverse direction. However, the invention is capable of providing its main wiping and cleaning function of the invention by substantially uni-directional rotation.

The invention may cause shield 24 to be rotated a prescribed number of rotations in a cleaning process. For example, during a first rotation (or first few rotations) the invention may apply cleaning fluid 29 onto shield 24 and during a subsequent rotation (or subsequent few rotations) omit the application of cleaning fluid 29. During the subsequent rotation or rotations, the wiper acts simply to wipe cleaning fluid and the wiper functions as a squeegee.

Figure 4:
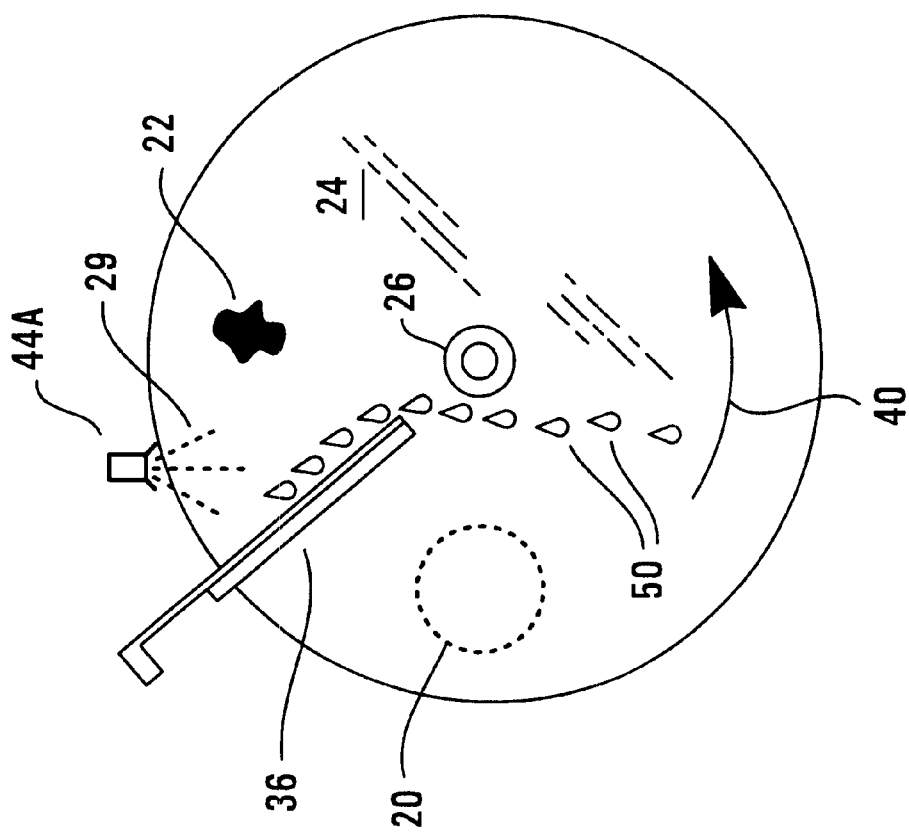
FIG. 4 is an elevation view of an alternative embodiment of a lens shield and contaminant cleaning system of the present invention.

FIG. 4 illustrates an alternate embodiment of the invention by illustrating a schematic of the shield area of the alternative embodiment. In FIG. 4, there is a spray nozzle 44A located at approximately the eleven o'clock location. The wiper arm 36 is located extends radially at approximately the ten o'clock position. The camera lens 20 is located at approximately the nine o'clock position. The rotation of shield 24 is counterclockwise as indicated by directional arrow 40. The embodiment of FIG. 4 operates in a similar fashion as that of FIG. 3. In particular, spray nozzle 44A sprays cleaning fluid 29 onto shield 24. Cleaning fluid 29 interacts with and loosens contaminants 22. Cleaning fluid 29 and contaminants 22 are dislodged and wiped by wiper blade 36 and become runoff 50. As shield 24 rotates, it is cleaned such that the cleaned shield 24 passes through the field of view of lens 20.

It should be understood that those skilled in the art would be capable of changing the direction of rotation of shield 24 from counterclockwise to clockwise and capable of rearranging the positions of fluid applicator 32 and wiper arm 36 to accommodate such clockwise rotation.

Figure 5:
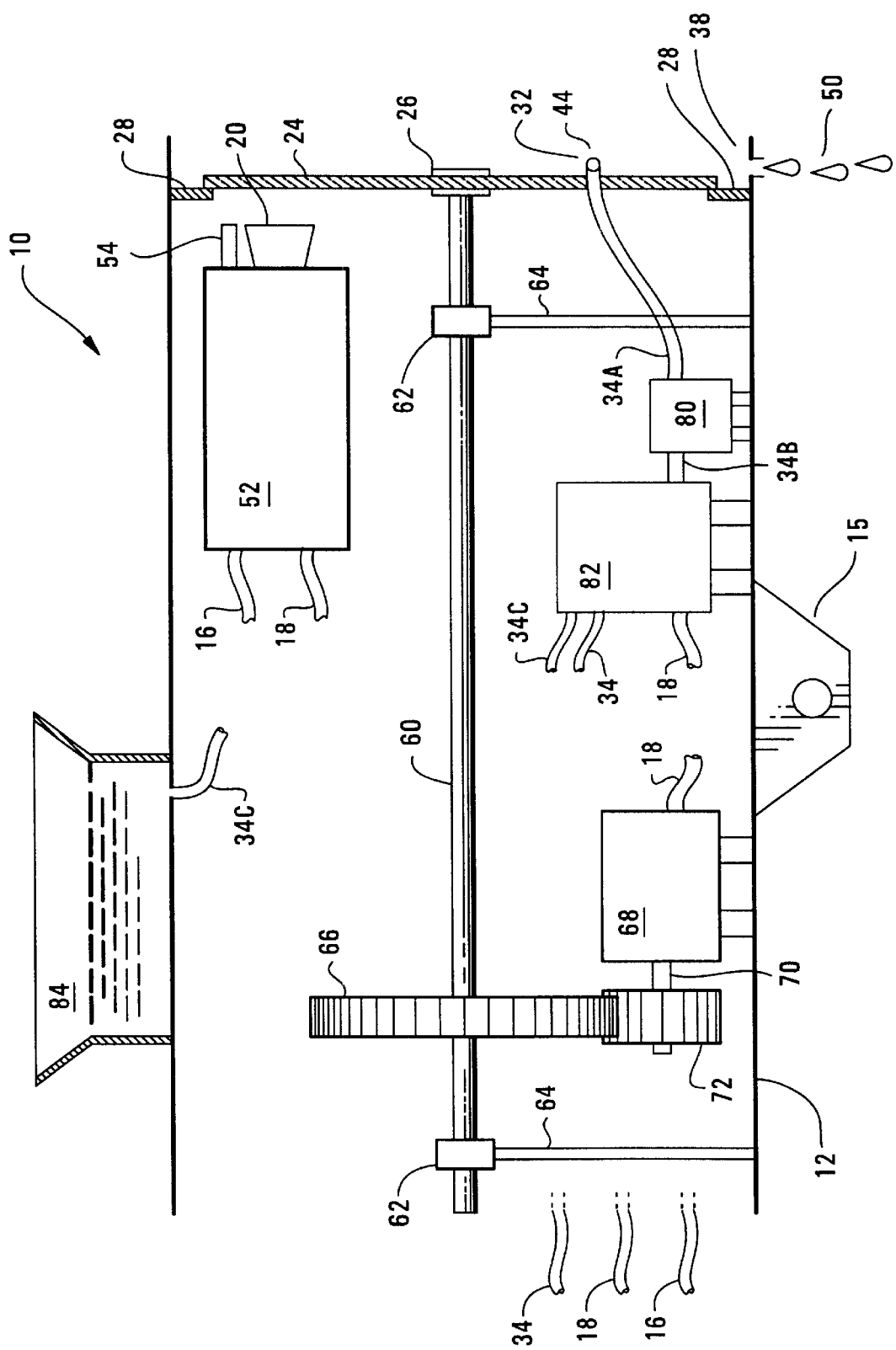
FIG. 5 is cut-away view to illustrate the internal mechanisms and positions of elements of the present invention.

FIG. 5 illustrates aspects of the present invention by providing a cut-away view which is taken perpendicular to shield 24, the portion cut away being the left side of housing 10 where this left side is visible in FIG. 2 and is left with respect to shield 24 of FIG. 2.

Shield 24 is located in front of lens 20 and lens 20 is a part of optical device 52 which is housed within housing 10. A light meter 54 located in a position such that it is able to collect ambient light level data for light that reaches lens 20. Further details of the function of light meter 54 will be provided elsewhere in this specification.

Shield 24 is secured to shield axle 60 by means of axle fastener 26. Axle is rotatably supported by bushings 62 each of which is supported by an axle support 64 which are secured to a side 12. A driven gear 66 is fixed to shield axle 60. Motor 68 is secured to housing 10. Motor 68 has motor shaft 70 which is driven in rotation by motor 68. Driving gear 72 is fixed to shaft 70. Driving gear 72 and driven gear 66 are mating gears with driving gear 72 transferring power from motor 68 to driven gear 66. Driving gear 72 will typically be a pinion having fewer teeth than driven gear 66 and resulting in reduced rotational speed and greater torque of shield axle 60 as compared to motor shaft 70. Motor 68 receives its electric power from power line 18. For clarity, the termination points of power line 18, data line 16, and fluid supply line 34 are indicated but portions of these lines are omitted so as to not obscure features of the invention.

The result of the mechanical arrangement described in this paragraph is that through the described gear mechanism, or by another mechanism selectable by skilled mechanics, motor 68 causes shield axle 60 to rotate in the desired rotational direction which in turn causes shield 24 to rotate in the desired rotational direction. It should be understood that skilled mechanics could devise other suitable configurations for rotating shield 24 and could select from a variety of types or specifications of motors.

Pump 80 is secured to a side 12. Pump 80 may be internally powered by an electric motor or a configuration could be made such that a single motor provides mechanical power to both rotate shield 24 and to operate pump 80. Pump 80 is connected to cleaning fluid applicator 32 by cleaning fluid line 34A. Pump 80 receives cleaning fluid 29 from fluid reservoir 82 by way of cleaning fluid line 34B. Fluid reservoir 82 receives cleaning fluid 29 by way of cleaning fluid line 34C. Cleaning fluid line 34C may simply receive tap water or cleaning fluid 29 from an external source or may alternatively, as indicated by hidden lines indicating an alternate cleaning fluid line 34C, may receive rain water collected by catchment 84. Catchment 84 may be integrated into the structure of housing 10 as is illustrated in FIG. 5 or catchment may be separately located, as for example, catchment 84 may be located atop a roof while housing 10 may be located under the eaves of the same roof with cleaning fluid line 34C providing for flow of cleaning fluid 29 (which could be rain water) from catchment 84 to pump 80. Fluid reservoir 82 may be provided with a cleaning fluid level sensor. This sensor may be used by an operator of the invention as a way of determining the amount of fluid in fluid reservoir 82, may be linked to an alarm system to inform the operator of the invention that fluid is below a predetermined level, may be connected to a shutoff system to shut off pump 80 to prevent pump 80 from pumping dry which could damage pump 80, and so forth.

Figure 6:
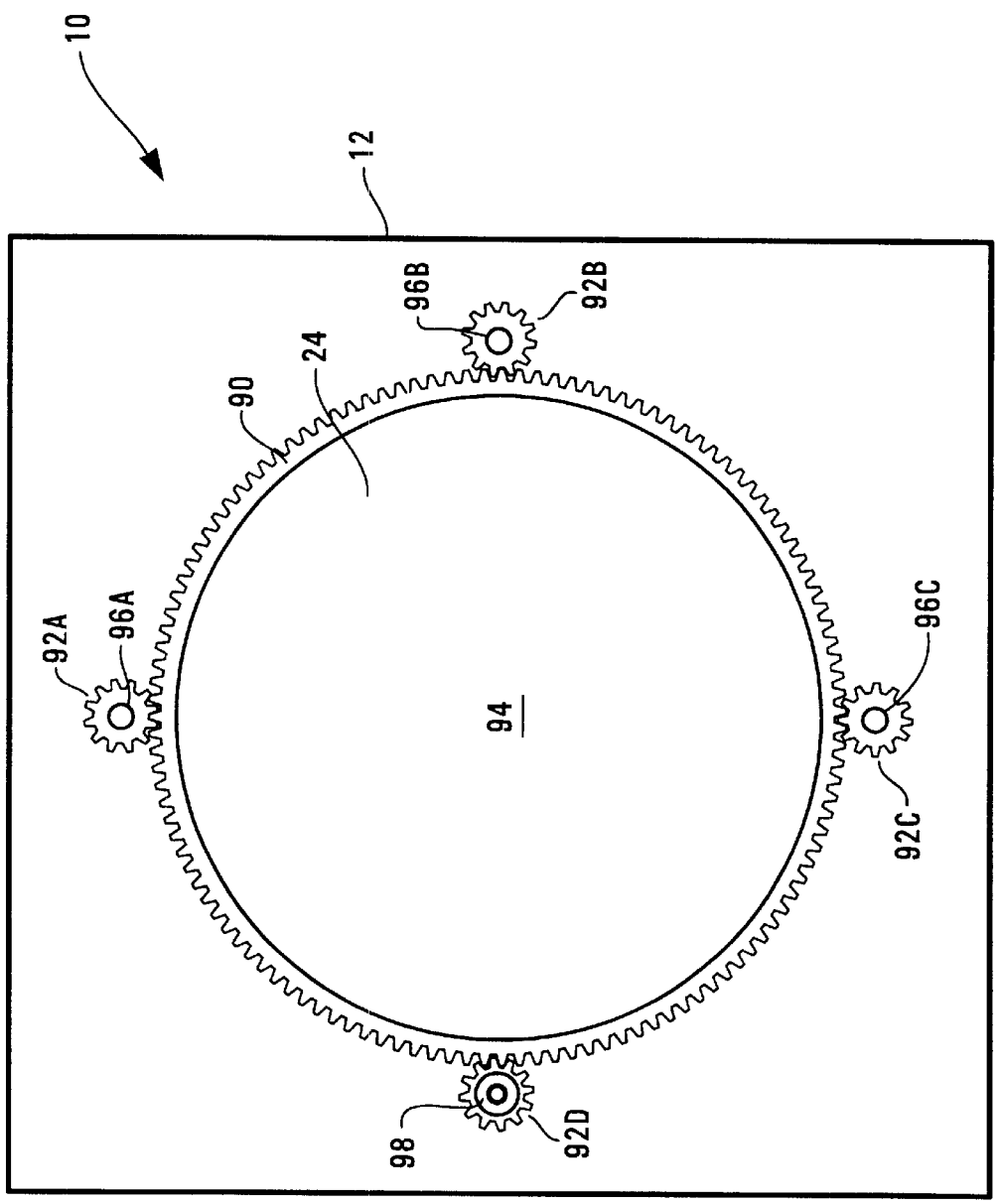
FIG. 6 illustrates an alternative mechanism for rotation of the lens shield of the present invention.

FIG. 6 shows an alternative rotation mechanism to provide for rotation of shield 24. It should first be noted that the embodiments illustrated by FIGS. 2 to 5 feature shield 24 being rotated by means of an axle that is fastened to shield 24 wherein shield 24 has an axis of rotation that is the same as axis of rotation of the axle that rotates shield 24. The embodiment of FIG. 6 does not have an axle fastened to shield 24 but instead shield 24 itself becomes the driven gear in the manner as is describe below. For clarity, FIG. 6 only illustrates a rotation mechanism for shield 24 and it omits other aspects of the invention since those other aspects are described with reference to FIGS. 2 to 5.

FIG. 6 is an elevation view an embodiment of shield 24. Ring 90 is fastened around the periphery of shield 24, the fastening being accomplished, for example, with a waterproof glue. Ring 90 has gear teeth around its circumference, that is, around its outer edge and ring 90 functions as a gear. A number of pinion gears, for example, four such gears 92A, 92B, 92C, and 92D are positioned around the periphery of ring 90 and mate with the gear teeth of ring 90. Pinion gears 92A to 92D allow ring 90 and shield 24 to rotate about an axis of rotation indicated by the location at which reference numeral 94 is placed, yet these pinion gears restrain lateral movement of ring 90 and shield 24. Not illustrated are low friction retainers, such as rollers or rings, which prevent shield 24 and ring 90 from moving in a forward or backward direction since such movement would result in the teeth of ring 90 becoming dislodged from their mating relationship with the teeth of the pinion gears.

Pinions 92A, 92B, and 92C freely rotate about pins 96A, 96B and 96C, respectively. Pins 96A, 96B, and 96C are fixed to a side 12 Pinion 92D does not freely rotate about a pin. Instead, pinion 92D has an axle affixed to it in the same manner as shield axle 60 was affixed to shield 24 as described in the embodiment of FIG. 5. The pinion axle, the end of which that is fastened to pinion 92D, is indicated by reference numeral 98, is mechanically linked to motor 68 within housing 10. With pinion axle 98 so fastened, motor 68 drives pinion axle 98 which in turn drives pinion 92D. Pinion 92D is a driving gear with respect to the gear of ring 90 with ring 90 being the driven gear. Shield 24 rotates with ring 90 since the two are fastened together. Accordingly, this embodiment provides a means for rotating shield 24 about an axis of rotation without using an axle fastened to that axis of rotation.

It should be understood that ring 90 is illustrative and that a design choice could feature a shield 24 being constructed of a transparent material such as plexiglass or another plastic where gear teeth are machined or molded integrally to the periphery of shield 24 and where a separate ring 90 is omitted.

Alternative rotation mechanisms may be provided for rotation of shield 24. For example, instead of toothed gears, a belt driven mechanism may be provided. Also, rather than toothed gears, rotational power may be transferred by means of smooth surfaces, such as rubber wheels, and so forth.

Figure 7:
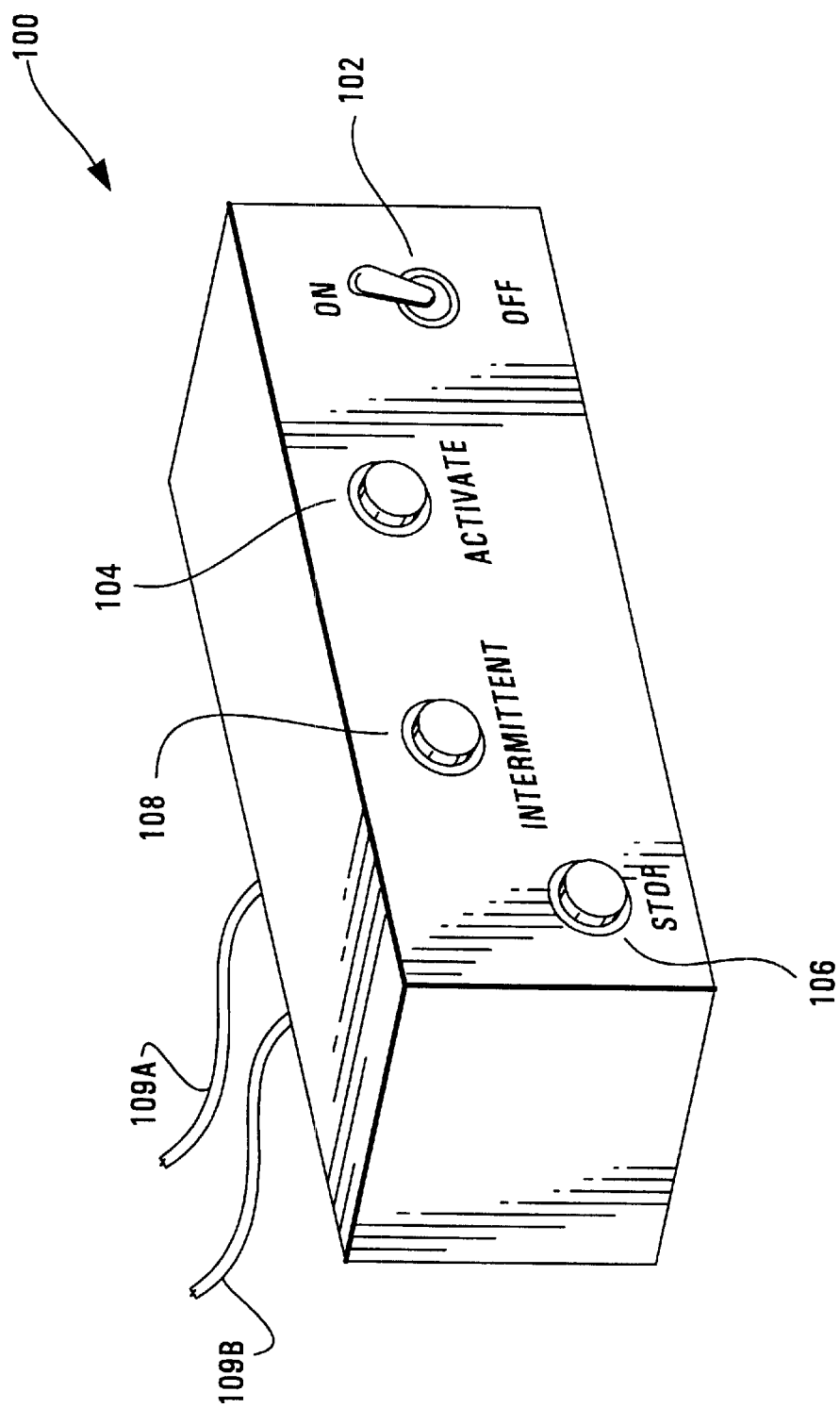
FIG. 7 illustrates perspective view of a controller which may be used with the present invention.

FIG. 7 illustrates an example of a controller 100 that may be employed by a human operator of the present invention. Controller 100 is used by to activate or deactivate the cleaning function of the invention. Controller 100 may be located within an office within a guard station for guards that monitor a remote camera housed within housing 10 or within other locations selected by the operator of the invention. Controller 100 has a system on/off switch 102 which when placed in the "on" position activates power to controller 100 such that controller 100 can respond to human commands to activate the cleaning function of the invention. When placed in the "off" position, on/off switch 102 deactivates power to controller 100 such that controller 100 is unavailable for use and such that the cleaning function of the invention is not then provided.

Controller 100 may have a controller integrated circuit (not illustrated) which responds to human commands which are entered by depressing buttons. Controller 100 has activate button 104 which when depressed causes the pump 80 to pump cleaning fluid 29 onto shield 24 and also causes motor 68 to rotate shield 24. Depression of stop button 106 causes both pump 80 to cease pumping cleaning fluid 29 onto shield 24 and motor 68 to cease rotating shield 24. In other words, depression of stop button 106 causes the cleaning function of the invention to cease until further activated by human command. Activate button 104 can provide a "constant on" function wherein the present invention provides for continuous cleaning until stop button 106 is depressed. This constant on function may be especially useful during times of heavy rain and wind, such as storm conditions.

Controller 100 has intermittent function button 108 which provides intermittent cleaning function. With the intermittent cleaning function, the controller integrated circuit controls the cleaning function to alternate the cleaning function for a defined period of time with the stop function for another defined period of time. The periods of time are either pre-set by the manufacturer of the invention or are programmed by the user of the invention, depending upon the features provided with the invention. For example, the intermittent cleaning function could provide cleaning for five minute periods, with each five minute period being separated by a one hour period. Thus, the cleaning function would be on for five minutes, off for one hour, on for five minutes, and so forth.

Rather than using the amount of time of rotation as a standard for operation, the invention may employ a rotation counter such that cleaning action is provided for one rotation of shield 24, for a fraction of a rotation of shield 24, or for substantially integer multiples of rotations, such as one rotation, two rotations, etc.

It should be understood that the amount of time for "on" and for "off" are design considerations and may be chosen from an unlimited number of possible alternatives. In fact, rotation could be provided on a continuous basis, that is, constantly on rotation, and the speed of such constantly on rotation could be very low but could depend upon the environment, such as faster in marine environments where there may be a greater frequency of contamination deposit.

With reference to the intermittent function, when it is no longer desired to use the intermittent function, the stop button 106 is depressed. It should be understood that controller 100 is illustrative as is the implementation of controller 100 using switches and buttons for entering control commands. Other implementations, such as keyboard entry, graphical user interfaces, for example, may be used.

Control signals to pump 80 are sent by pump data connection 109A while control signals to motor are sent by motor data connection 109B and these data connections may be low-voltage, low-current links that may be used to operate electrical power relays that provide operating power to motor 68 and pump 80

Figure 8:
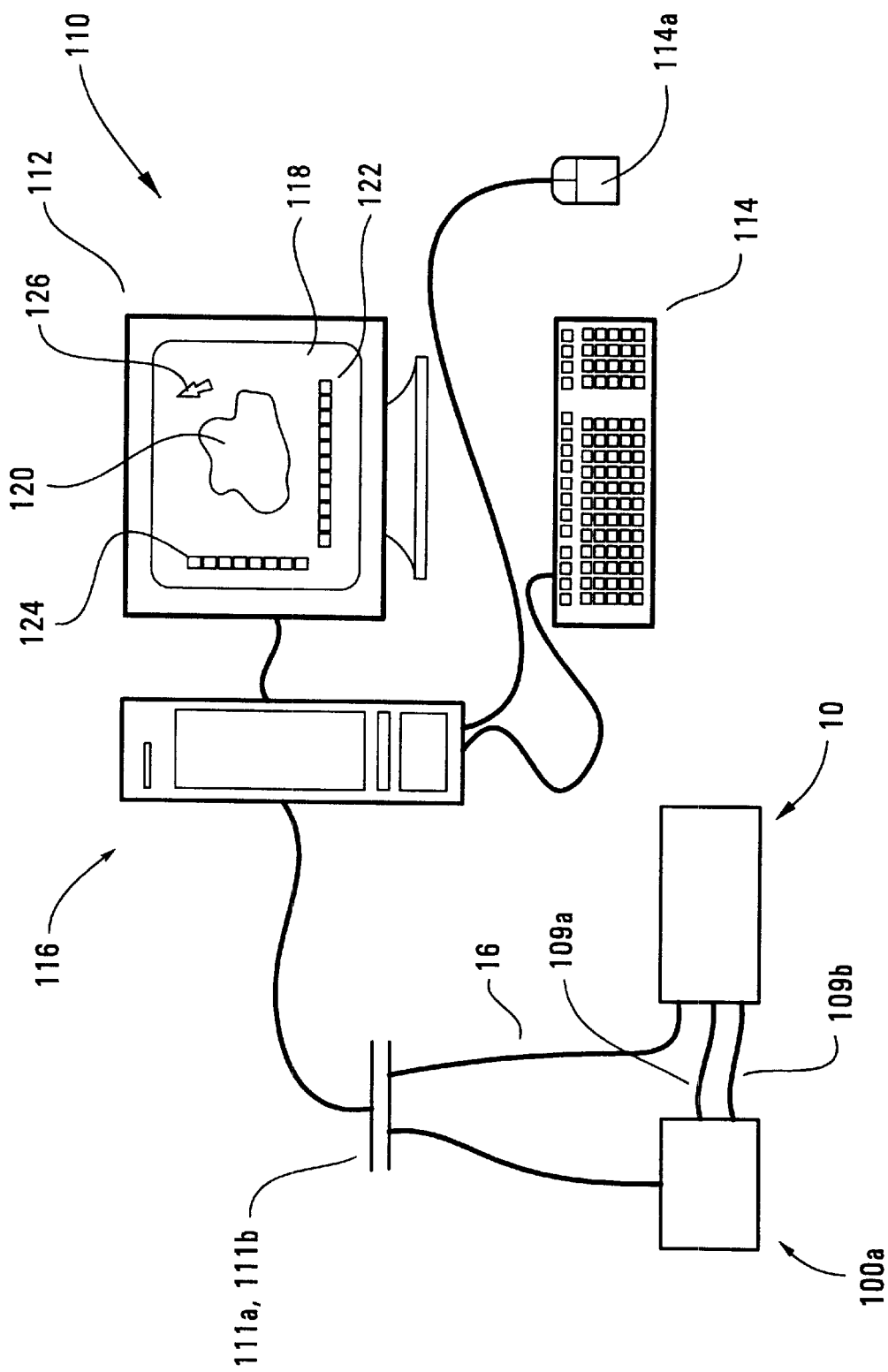
FIG. 8 illustrates a perspective view of a computer terminal used as an alternative controller of the present invention.

FIG. 8 illustrates an alternative controller of the present invention. This controller is a computer terminal 110 such as those used in conjunction with the internet or with private networks. Computer terminal 110 may be connected to a network, which may be a public network 111A such as the internet or which may be a private network 111B. Computer terminal 110 has monitor 112 upon which visual images are presented, has keyboard 114 and mouse 114A, both for entry of information and requests by the user of terminal 110, and has central processing unit 116 which controls monitor 112 and keyboard 114 and so forth. Monitor 112 has screen viewing area 118 which is that part of monitor 112 that is the video screen itself. Screen viewing area 118 is used to view camera image 120 which is an image that is seen by an optical device 52 such as a camera that is selected by the user of terminal 110. For example, camera image 120 may be the image provided by a web camera selected by the viewer.

Also presented on viewing area 118 is a set of image selection controls 122 which provides a graphical user interface and which controls are used for selecting images, including by way of links from page to page on the internet, for enlarging or reducing the size of the image, and so forth. Image selection controls 122 may be provided independent of the viewer, as by independent operators of web cameras, and their layout and graphics may change from site to site.

Also presented on viewing area 118 is a set of camera cleaning controls 124.

Image selection controls 122 and camera cleaning controls 124 are pictured as two separate bars of control tabs or buttons but graphical user interface configurations other than bars could be employed either in conjunction with or instead of bars. For example, radio buttons, pull down menus, arrangements of hyperlinks, and so forth may be employed.

Cursor 126 is used to activate controls among image selection controls 122 and among camera cleaning controls 124, this activation being accomplished, for example, by using mouse 114A to move cursor 126 to the appropriate location of the control bar and double-clicking the mouse to activate the control desired. The system of the present invention may allow all users to activate the cleaning function of the system at any time. Alternatively, the system may be limited to use of supervisors associated with the operators of the camera and in such case the camera cleaning controls 124 would be neither displayed nor available to a viewer not having authorization from the system. Still further, the system could allow any user to operate the camera cleaning controls 124 but could limit access to such controls as by not allowing cleaning by any viewer any more frequently than a prescribed period of time, for example, not more frequently than one hour. This type of limited access could conserve cleaning fluid 29 and reduce wear and tear on system components, such as motor 68 and pump 80. The system may have a pre-defined cleaning routine, such as if cleaning is requested the motor 68 and pump 80 are activated for a fixed period such as five minutes and then deactivated and unavailable for the following one hour time period. With such a system, the cleaning controls could be displayed only when the cleaning function is permitted.

The system just described could use a public network 109A or a private network 109B to communicate with controller 100A and for transmission of images through data wire 16. Controller 100A would be similar in function to that described in connection with the embodiment of FIG. 7 but would not need the buttons and switch input functions described in conjunction with FIG. 7 since a graphical user interface would be provided for input.

It should be understood that a system not using a graphical user interface could be employed to input cleaning function commands. For example, a text entry base command system could be used within the spirit of the present invention.

Figure 9:
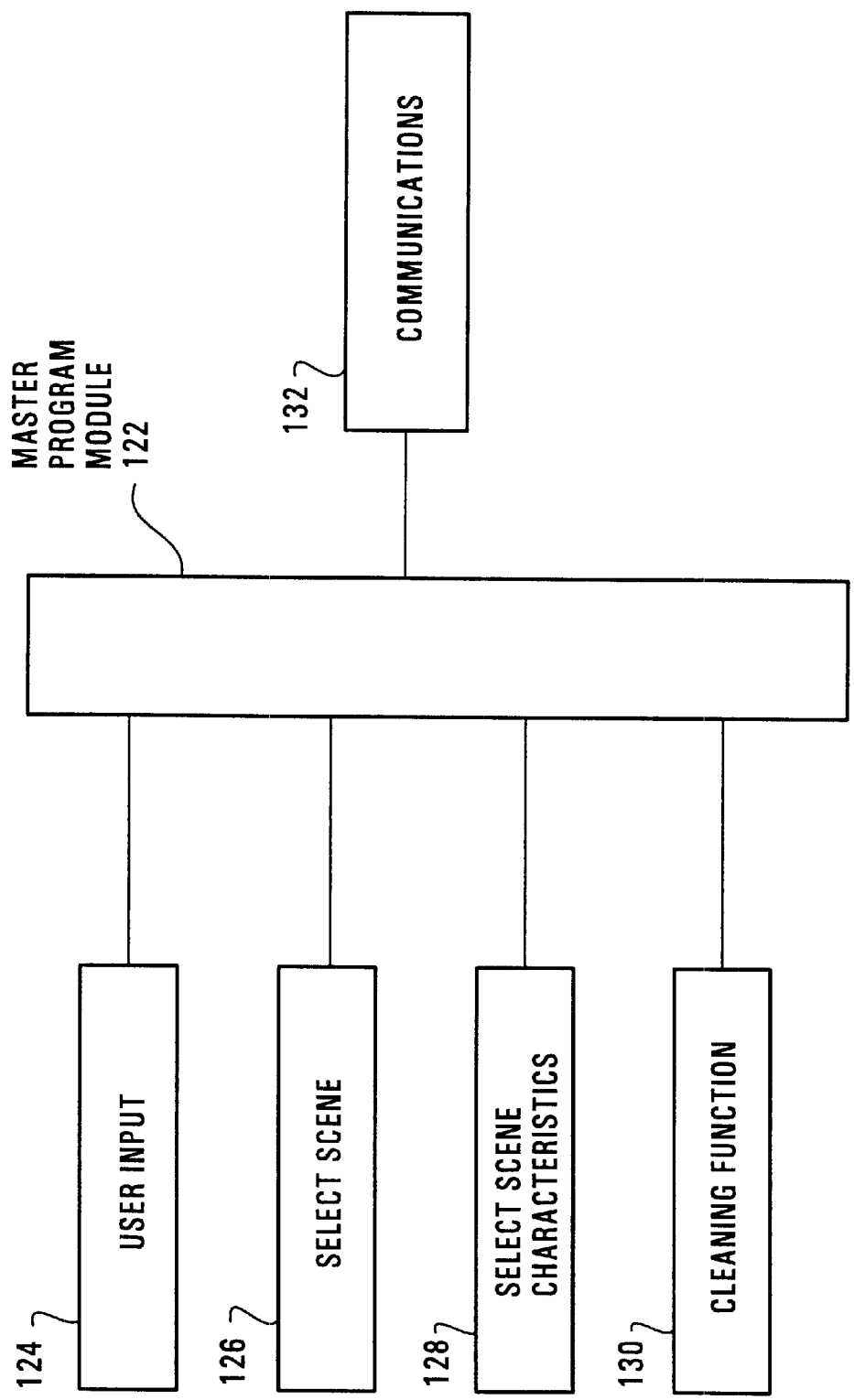
FIG. 9 illustrates a computer based software operating system for use with the present invention.

FIG. 9 illustrates a computer based software operating system 120 and its software modules for the system described in connection with FIG. 8. Master program module 122 coordinates the operating system 120 and receives viewer instructions from user input module 124. Select scene module 126 allows the viewer to select the camera that features the scene to be viewed. Adjust scene characteristics module 128 allows the viewer to change the size of the image displayed on the video screen or perhaps may permit the viewer to move the camera to a different field of view and so forth. Cleaning functions module 130 provides the cleaning functions that are described in connection with FIG. 8. Communications module 132 provides for communication between master program 122 and the network 111A or 111B as well as to the controller 110A illustrated in FIG. 8. Each of the modules just described communicate with master program 122.

Figure 10:
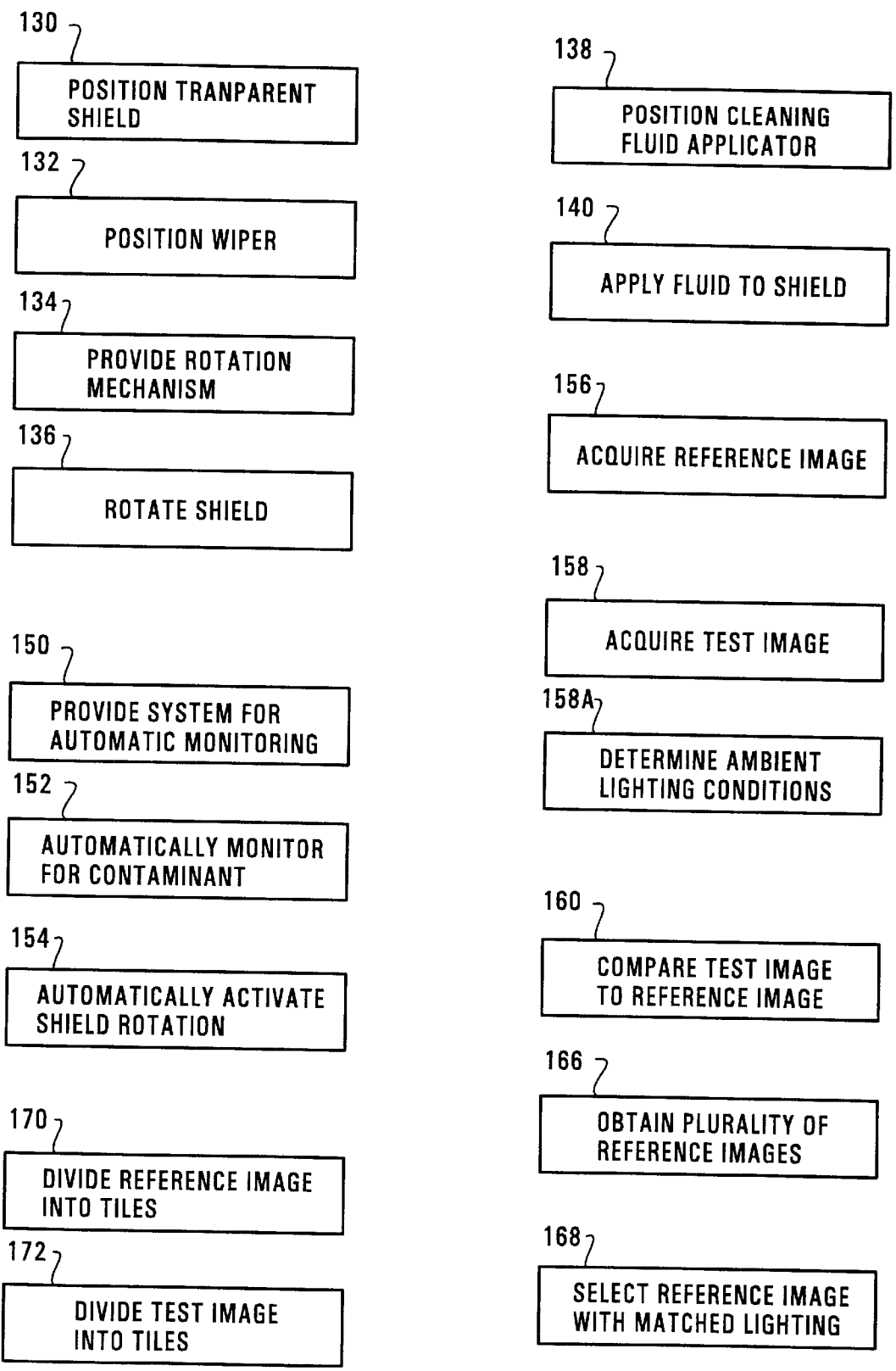
FIG. 10 illustrates image processing aspects of an embodiment of the present invention.

FIG. 10 illustrates steps of the process of the present invention. FIG. 10 should be viewed in conjunction with FIG. 5 which illustrates physical elements of the present invention and which has been discussed in detail above. The present invention provides a method for shielding the lens and the field of view of an optical device from obstruction by unwanted contaminants such as dust, dirt, rain, and the like. This method provides a step 130 of positioning a transparent shield to protect the lens from contaminants. A step 132 of positioning a wiper to be in contact with the shield but positioning said wiper to not obstruct the field of view is performed. A step 134 of providing a rotation mechanism is performed for causing rotation of the shield wherein such rotation of the shield causes the shield to wipe against the wiper. With the foregoing steps accomplished, the invention is ready for operation.

In the forgoing method steps, and elsewhere in this application, the use of words such as the "the method includes", "may include", "includes" or similar such language like, are intended to be open-ended in nature to allow for the presence of additional apparatus elements or method steps.

In using the invention, there is included a step 136 of using the rotation mechanism to cause rotation of the shield. The result of such rotation of the shield is that contaminants that may be deposited upon the shield may be wiped from the shield by the wiper as a result of such rotation. However, this cleaning is accomplished in a way such that the wiper does not obstruct the field of view.

The invention may further include a step 138 of positioning a cleaning fluid applicator such that it may apply cleaning fluid to the shield. After the cleaning fluid applicator has been provided, the invention may include a step 140 of applying cleaning fluid to the shield such that the cleaning fluid may be wiped from the shield by the wiper as a result of the rotation of the shield.

The invention may further include a step of 150 providing a system for automatically monitoring for the presence of the contaminant on the shield. The invention may further include a step 152 of using such system for automatically monitoring for the presence of the contaminant on the shield. Using such information obtained by automatically monitoring, the invention may further include the step 154 of upon the detection of the contaminant, automatically activating said rotation.

The invention may employ image processing to determine the need for cleaning shield 24 and if there is a need to automatically activate such cleaning. In one example of the image processing embodiment, the optical device 52 is a digital camera and will be referred to as "camera 52" for clarity. Camera 52 has a variable focus feature and in its usual operation is focused at infinity which is generally optical distance the scene to be viewed. Camera 52 is also capable of focus at or near the distance separating lens 20 and shield 24. Typically, lens 20 may be located a few inches behind shield 24.

In the method of the invention, the step 152 of automatically monitoring may further include a step 156 of acquiring at least one reference image of the shield, a reference image being one that is acquired when said shield is known to be free of contaminants and a step 158 of acquiring at least one test image of the shield, a test image being one that is acquired to determine if a contaminant is present on the shield. The step 152 of automatically monitoring may further include a step of 160 comparing the test image with at least one the reference image to determine if there is a significant difference between the test image and the reference image.

The method of the present invention may be carried out in a way such that the step 156 of acquiring at least one reference image of said shield includes a step 166 of acquiring a plurality of reference images with while using light meter 54 to measure ambient lighting conditions associated with each reference image. The invention may further be carried out in such a way that the step 158 of acquiring test images includes a step 158A of determining ambient lighting conditions associated with said test image and may also include the step 168 of selecting a reference image for comparison with the test image where such selection is performed by matching ambient lighting conditions associated with the test image with ambient lighting conditions associated with the reference image.

In carrying out the image processing aspect of the present invention, the following steps may be undertaken:

First, in the step 156 of reference image acquisition, the focus of camera 52 is adjusted to focus on shield 24, that is, to focus at a distance of the few inches separating shield 24 from camera 52. An image is received by camera 52 and is determined to be an acceptable reference image whereupon it is digitally stored in the memory (not shown) of the system. An image is an acceptable reference image is one which the operator of the system determines by visual inspection is an image that was made when shield 24 is free of any contaminant 22. Readings from light meter 54 (see FIG. 5) may be taken and such readings may be conveyed to the control system. Either light meter 54 is a digital output light meter or an analog/digital converter is used such that the control system can receive digital light level data for convenient processing. Step 156 is repeated until collection of acceptable reference images is acquired with different reference images corresponding to different levels of ambient light, the collection being a library of images of shield 24, each image being made when shield 24 is free of contaminants 22 and the library being indexed according to the ambient light level when the image was captured.

In performing the image processing, the system performs step 158 of test image acquisition by, for example, using camera 52 to focus on shield 24 and to capture a test image as well as to determine the ambient light level. Then the system retrieves the reference image that corresponds to the ambient light just measured. The test image is compared digitally with the reference image and if a significant difference is found it is attributed to a contaminant 22 having been deposited on shield 24. The threshold upon which a difference between images is determined to be significant may be varied according to the level of sensitivity desired and would depend upon the particular algorithm used to determine differences between images. When the system has determined that the test image has a significant difference compared to the reference image, then the system may activate motor 68 and pump 80 to accomplish cleaning of shield 24. After a predetermined amount of time, which is believed to be sufficient for the probable removal of contaminant 22, has elapsed the system deactivates motor 68 and pump 80 and the cleaning function of the system is ceased. The system may have a feature that is recursive in nature such that after cleaning ceases a subsequent test image is acquired shortly after cleaning has ceased and if the subsequent image displays a significant difference to the reference image then further cleaning is performed and so forth. This recursive testing may occur for a prescribed number of iterations.

The image processing function of the present invention may be accomplished by performing additional steps in the step 156 of acquiring reference images. The additional steps include the step 170 of dividing each reference image into sections, similar to patterns of rectangular tiles which are referred to as "tiles." This division process is performed by using the bitmap of each respective reference image. The tiles are each labeled with a row and column number for location identification.

The image testing function of the present invention may be accomplished by performing the step 172 of dividing a test image into such tiles and the tiles are similarly assigned row and column numbers.

The method of the present invention may include a step of making a video screen based human interface link between a video screen and other components of the invention. The method may further include steps of using the interface link to control rotation mechanism, the application of cleaning fluid, and other aspects of the invention. The interface link may be a public network, such as the internet, or a private network.

Figure 11:
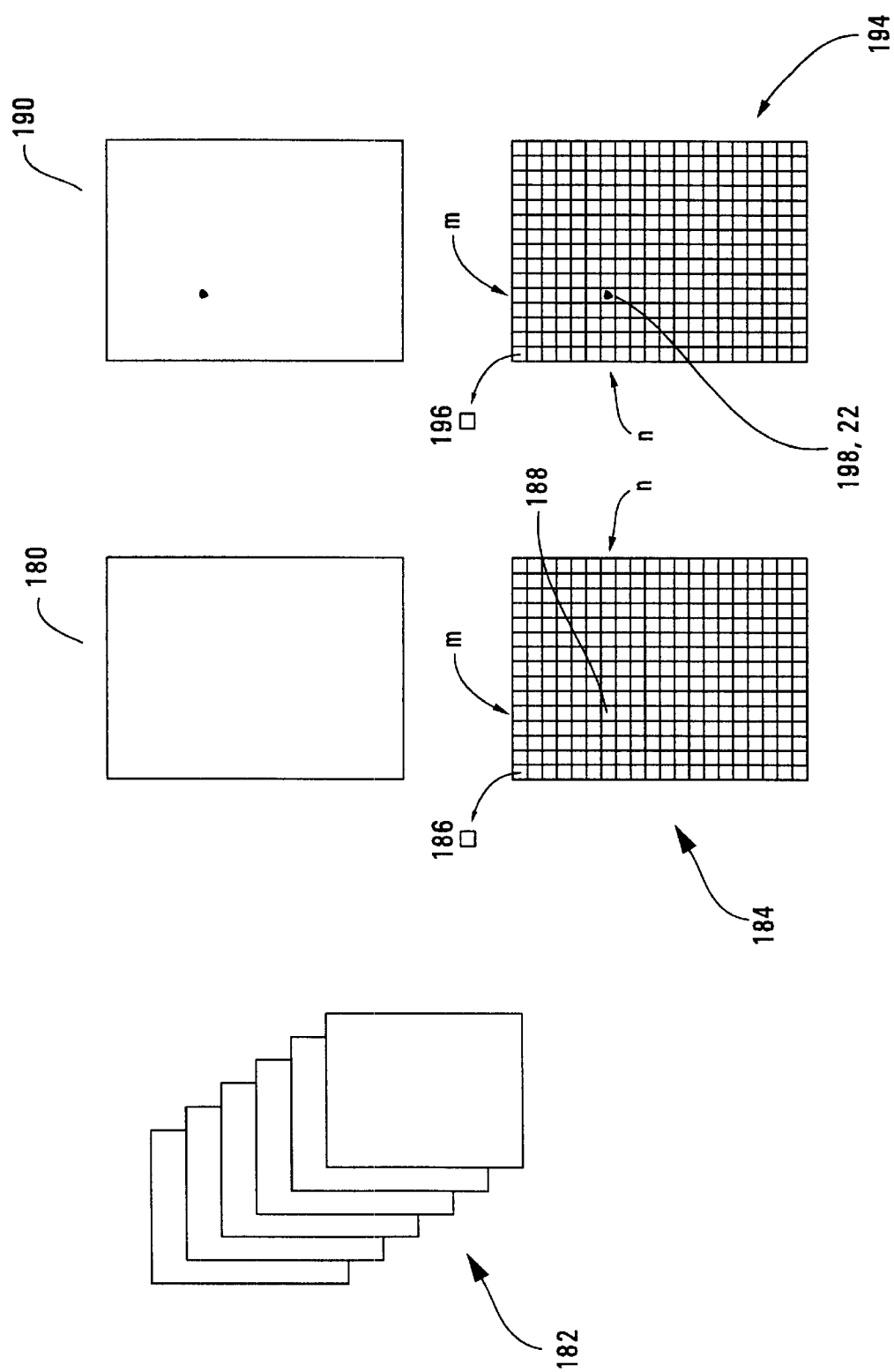
FIG. 11 illustrates steps of the process of the present invention.

Now referring to FIG. 11 graphical representations are provided of images that are acquired in the performance of the process described in connection with FIG. 10. Reference image 180 is a reference image that has been acquired in accordance with the process of the present invention. Reference library 182 is a collection of different reference images 180. It should be understood that a reference image 180 is not an image of the entire shield 24 but instead is an image of that part of shield 24 which appears immediately in front of lens 20 and in the field of view of optical device 52. It should also be understood that different portions of shield 24 may be rendered into images since shield 24 may be rotated as reference images are acquired. However, images of different portions of shield 24 will be closely similar since shield 24 is constructed of transparent, homogeneous material.

Each reference image 180 is divided into tiles as mentioned above and the tiled reference image 184 illustrates a tile pattern superimposed over reference image 180. Reference tile 186 is illustrated. The process of division into tiles is carried out using appropriate algorithms and electronic data processing and is carried out through software or through an equivalent process embodied in hardware elements. Stored in the memory of the invention, along with the image of tile 186, would be the ambient light conditions associated with reference tile 186 as well as row and column data to identify the location of tile 186. For reference tile 186, we could assign "row 1" and "column 1." Reference tile 188 is a reference tile chosen at a particular row n and column m of a reference image, the row and column being arbitrarily chosen for the purposes of discussion. It should be noted that this tile, as other reference tiles, is a part of an image that was made with such image being free of contamination.

Test image 190 has associated with it ambient light condition data such that a reference image 180 having appropriately matched ambient light condition data may be selected. Test image 190 is divided into tiles similar to the process for dividing reference images into tiles. Tiled test image 194 illustrates the tile pattern superimposed onto the image of test image 190. Test tile 196 is illustrated which corresponds to reference tile 186, both tiles having the same row and column number. Each test tile has associated with it row and column data for location identification and for matching to row and column data of stored reference tiles. Each test tile of the test image 190 is compared to the corresponding reference tile of the reference image 180 and if a significant difference is found between the test tile and its corresponding reference tile then the system considers a contaminant 22 to be present and the system activates the cleaning function.

Now considering test tile 198 it can be observed that it is of the same particular row n and column m of reference tile 188. It can also be observed that for the purposes of illustration contaminant 22 is imaged into test tile 198 meaning that when test image 194 was made contaminant 22 was on shield 24 at a location corresponding to that of test tile 198. The present invention compares test tile 198 with its reference counterpart of the same row and column, reference tile 188. The corresponding bits of the bitmaps of the reference tile 188 and test tile 198 may be compared, for example, by subtracting bit values, and if a predetermined or greater difference is found, then the invention may determine that a contaminant 22 was present on shield 24.

The selection of the number of tiles to divide images into is a design choice with more tiles tending to produce greater resolution but also tending to use greater computational resources.

It should be understood that while housing 10 serves to house many elements of the invention, and while some elements of the invention are necessarily housed within housing 10, it is actually the case that some elements of the invention may be located separately from housing 10. For example, the memory and data processing functions of the image processing function of the invention may be located in a specialty chip set located within housing 10. Conversely, these memory and data processing functions may be located within a general purpose computer located separately from housing 10, such as within computer terminal 110.

In yet another embodiment, automatic monitoring for contaminants 152 may be accomplished by calculating motion vectors associated with movement of items in the field of view of lens 20 where such movement is detected during the time that shield 24 is being rotated. Such calculated motion vectors would be compared with predicted vectors. The predicted vectors would be vectors predicted, using suitable algorithms, where the prediction is done using inputs of the rotational speed of shield 24 and the distance that the moving item is from the axis of rotation. In other words, if the invention determines that an item is moving in an arc at the same rotational velocity as shield 24 when shield 24 is known to be moving, then the system would treat the item as a contaminant. This type of simple test for contaminants 22 could rotate shield 24 through a small angle of rotation while determining if any objects moved along with such rotation with movement that is consistent with rotation caused by rotation of shield 24.

In the event that the optical device 52 of the invention is a projection system, such as a video projector, then an alternative contaminant detection system could be employed. The optical device 52 could be caused to project a white image and a camera could be employed to obtain a view of the white image. If the image of the white image revealed an object other than white space, then the system could infer that the object was a contaminant 22 on shield 24 and then activate the cleaning function of the invention. Objects may be revealed on white images through employment of a tile-based resolution process as described above.

Although several embodiments of the present invention have been disclosed and illustrated, the invention is not limited to the specific forms or arrangements of parts so described and illustrated. The invention is only limited by the claims.

What is claimed is:

1. An apparatus for shielding the field of view of an optical device from obstruction by unwanted contaminants, the apparatus comprising:

a transparent shield positioned to protect the optical device from contaminants; a wiper positioned to be in contact with said shield but said wiper positioned not to obstruct the field of view;

a rotation mechanism for causing rotation of said shield;

a controller for activating and deactivating said rotation mechanism; and a video screen for viewing through the field of view and a screen based human interface linked to said controller, the screen based human interface for operating said controller to thereby activate and deactivate said rotation mechanism;

whereby contaminants that may be deposited upon said shield may be wiped from said shield by said wiper and whereby said wiper does not obstruct the field of view.

2. The apparatus of claim 1, further comprising a network link between said video and said controller.

3. The apparatus of claim 1, wherein said rotation mechanism has an axle fixed to said shield and wherein rotation of said axle causes rotation of said shield.

4. The apparatus of claim 1 further comprising a system for automatic detection of contaminants on said shield whereby the contaminants on said shield may be automatically detected.

5. The apparatus of claim 1 further comprising a cleaning fluid applicator for applying a cleaning fluid to said shield whereby cleaning fluid may be wiped from said shield by said wiper as a result of such rotation.

6. An apparatus for shielding the field of view of an optical device from obstruction by unwanted contaminants, the apparatus comprising:

a transparent shield positioned to protect the optical device from contaminants;

a wiper positioned to be in contact with said shield but said wiper positioned not to obstruct the field of view;

a rotation mechanism for causing rotation of said shield, wherein said rotation mechanism has no axle fixed to said shield;

whereby contaminants that may be deposited upon said shield may be wiped from said shield by said wiper and whereby said wiper does not obstruct the field of view.

7. The apparatus of claim 6 wherein said mechanism imparts a torque along a periphery of said shield.

8. An apparatus for shielding the field of view of an optical device from obstruction by unwanted contaminants, the apparatus comprising:

a transparent shield positioned to Protect the optical device from contaminants;

a wiper positioned to be in contact with said shield but said wiper positioned not to obstruct the field of view;

a rotation mechanism for causing rotation of said shield;

a system for automatic detection of contaminants on said shield whereby the contaminants on said shield may be automatically detected; wherein said system for automatic detection of contaminants further comprises a library of reference images of said shield;

whereby contaminants that may be deposited upon said shield may be wiped from said shield by said wiper and whereby said wiper does not obstruct the field of view.

9. The apparatus of claim 8 further comprising a system automatic rotation of said shield whereby said shield may be automatically rotated upon said automatic detection of the contaminants.

10. A method for shielding the field of view of an optical device from obstruction by unwanted contaminants, the method comprising:

a step of positioning a transparent shield to Protect the optical device from contaminants;

a step of positioning a wiper to be in contact with said shield but positioning said wiper to not obstruct the field of view;

a step of providing a rotation mechanism for causing rotation of said shield;

a step of using said rotation mechanism to cause rotation of said shield;

a step of providing an automatic monitoring system for automatically monitoring for the presence of the contaminant on said shield, and a step of using said automatic monitoring system for automatically monitoring for the presence of the contaminant on said shield;

wherein said step of automatically monitoring further comprises:

a step of obtaining at least one reference image of said shield, a reference image being one that is obtained when said shield is known to be free of contaminants;

a step of obtaining at least one test image of said shield, a test image being one that is obtained to determine if a contaminant is present on said shield;

a step of comparing said test image with at least one said reference image to determine if there is a significant difference between said test image and said reference image;

whereby contaminants that may be deposited upon said shield may be rotated away from the field of view, whereby contaminants that may be deposited upon said shield may be wiped from said shield by said wiper, and whereby said wiper does not obstruct the field of view.

11. The method of step 10 wherein: said step of obtaining at least one reference image of said shield comprises a step of obtaining a plurality of reference images where ambient lighting conditions are associated with each reference image;

wherein said step of obtaining at least one test image comprises a step of determining ambient lighting conditions associated with said test image; and further comprising the step of:

selecting a reference image for comparison with said test image where such selection is performed by matching ambient lighting conditions associated with said test image with ambient lighting conditions associated with said reference image.

12. The method of claim 10 further comprising:

a step of positioning a cleaning fluid applicator such that it may apply cleaning fluid to said shield; and a step of applying cleaning fluid to said shield whereby said cleaning fluid may be wiped from said shield by said wiper as a result of such rotation.

13. A method for shielding the field of view of an optical device from obstruction by unwanted contaminants, the method comprising:

a set of positioning a wiper to be in contact with said shield but positioning said wiper to not obstruct the field of view;

a step of providing a rotation mechanism for causing rotation mechanism for causing rotation of said shield;

a step of using said rotation mechanism to cause rotation of said shield;

a step of making a video screen based human interface link between a video screen and said rotation mechanism; a step of using said interface link to control said rotation mechanism;

whereby contaminants that may be deposited upon said shield may be wiped from said shield by said wiper, and whereby said wiper does not obstruct the field of view.

14. The method of claim 13 wherein said interface link is made using the internet.

* * * * *